(12) United States Patent
Wildig et al.

(10) Patent No.: US 9,310,103 B2
(45) Date of Patent: Apr. 12, 2016

(54) METHOD AND DEVICE FOR HEATING AND COOLING

(75) Inventors: Thomas Wildig, Sollentuna (SE); Björn Giertz, Bromma (SE)

(73) Assignee: SCANDINAVIAN ENERGY EFFICIENCY CO. SEEC AB, Saltsjo-Duvnas (SE)

( * ) Notice: Subject to any disclaimer, the term of this patent is extended or adjusted under 35 U.S.C. 154(b) by 1380 days.

(21) Appl. No.: 12/279,542

(22) PCT Filed: Jan. 22, 2007

(86) PCT No.: PCT/SE2007/050034
§ 371 (c)(1),
(2), (4) Date: Aug. 15, 2008

(87) PCT Pub. No.: WO2007/097701
PCT Pub. Date: Aug. 30, 2007

(65) Prior Publication Data
US 2010/0307734 A1    Dec. 9, 2010

(30) Foreign Application Priority Data
Feb. 24, 2006    (SE) ..................... 0600428

(51) Int. Cl.
*F25D 23/12* (2006.01)
*F03G 7/00* (2006.01)
*F03G 7/04* (2006.01)
*F24J 3/08* (2006.01)
*F25B 29/00* (2006.01)
*F28D 20/00* (2006.01)

(52) U.S. Cl.
CPC ............. *F24J 3/083* (2013.01); *F28D 20/0052* (2013.01); *F24J 2003/089* (2013.01); *Y02E 10/125* (2013.01); *Y02E 60/142* (2013.01)

(58) Field of Classification Search
USPC ............ 165/45, 47, 48.1, 236, 253, 256, 260, 165/261, 287–289; 60/641.1–641.6; 405/56; 62/260; 126/620
See application file for complete search history.

(56) References Cited

U.S. PATENT DOCUMENTS 3,354,654 A * 11/1967 Vignovich ...................... 62/260
4,054,176 A * 10/1977 Van Huisen .................... 165/45
(Continued)

FOREIGN PATENT DOCUMENTS

| DE | 25 50 863 A1 | 5/1976 |
| DE | 30 19 031 A1 | 12/1980 |
| DE | 19844285 A1 * | 3/2000 |

*Primary Examiner* — Frantz Jules
*Assistant Examiner* — Erik Mendoza-Wilkenfel
(74) *Attorney, Agent, or Firm* — Young & Thompson

(57) ABSTRACT

Method and device for storing thermal energy in, and recapturing thermal energy from, respectively, an underground energy storage (1), having at least four holes (2), through which a heat carrier is transported and therewith heating or cooling the ground (3), respectively. The holes (2) are arranged essentially along at least two concentric circles (10, 11, 12). A control gear is arranged to control a valve system, which is arranged to direct the heat carrier to holes that are arranged along one circle and thereby heating or cooling, respectively, the ground along the circle. When the temperature of the heat carrier is higher than that of the surrounding ground (3), inner circles are heated before outer circles, and when the temperature of the heat carrier is lower than that of the surrounding ground (3), outer circles are cooled before inner circles.

20 Claims, 3 Drawing Sheets

(56) References Cited

U.S. PATENT DOCUMENTS

| | | | |
|---|---|---|---|
| 4,157,730 A | 6/1979 | Despois et al. | |
| 4,360,056 A * | 11/1982 | O'Connell | 165/45 |
| 4,392,531 A * | 7/1983 | Ippolito | 166/278 |
| 4,397,152 A * | 8/1983 | Smith | 60/641.15 |
| 4,402,188 A * | 9/1983 | Skala | 62/56 |
| 4,444,249 A * | 4/1984 | Cady | 165/48.2 |
| 4,445,499 A * | 5/1984 | Platell | 126/620 |
| 4,522,253 A * | 6/1985 | Levin | 165/207 |
| 4,577,679 A * | 3/1986 | Hibshman | 165/45 |
| 5,025,634 A * | 6/1991 | Dressler | 62/79 |
| 5,224,357 A * | 7/1993 | Galiyano et al. | 62/260 |
| 5,388,419 A * | 2/1995 | Kaye | 62/160 |
| 5,461,876 A * | 10/1995 | Dressler | 62/160 |
| 6,585,036 B2 * | 7/2003 | Amerman et al. | 165/45 |
| 6,672,371 B1 * | 1/2004 | Amerman et al. | 165/45 |
| 6,701,914 B2 * | 3/2004 | Schwarz | 165/10 |
| 7,334,406 B2 * | 2/2008 | Licari et al. | 60/641.2 |
| 7,578,140 B1 * | 8/2009 | Wiggs | 62/260 |
| 2003/0000680 A1 * | 1/2003 | Schwarz | 165/45 |
| 2004/0194914 A1 * | 10/2004 | Johnson et al. | 165/45 |
| 2005/0061472 A1 * | 3/2005 | Guynn et al. | 165/45 |
| 2006/0201179 A1 * | 9/2006 | Kidwell et al. | 62/260 |

* cited by examiner

METHOD AND DEVICE FOR HEATING AND COOLING

The present invention relates to a method for storing thermal energy in an underground energy storage, and for recapturing thermal energy from the storage, respectively.

Various locations of the earth have different seasonal variations. Often a pattern of variation is found in which certain parts of the year is relatively colder, and in which other parts are relatively warmer. In these cases, there is often a need for heating during the colder period. Correspondingly, there is often a need for cooling during the warmer period. This need is present to a varying extent in different parts of the world, and the needs for heating and cooling, respectively, are not always of the same magnitude at the same place.

For example, houses have such needs for heating and/or cooling. However, it should be realized that also other types of facilities, such as industrial facilities, in certain cases have the need for heating and/or cooling, depending on the characteristics of the facility and the seasonally dependent average air temperature.

Today, so-called geothermal systems, that use the ground as energy storage for heating and/or cooling a facility, are often used. This means that thermal energy is harvested from the ground during the cold period, when the ground on average is warmer than the air. On the contrary, coldness is harvested from the ground during the warm period, when the ground is colder on average than the air. One can view this as if the ground is drained of thermal energy during the cold period, and is replenished with thermal energy during the warm period. Thus, a house can for example be kept at an even temperature, using the ground as levelling energy storage. This minimizes the need for externally supplied energy for heating and cooling of the facility.

In known such energy storages, one or several vertical holes are used, in which a heat carrier, for example a mixture of glycol and water, is brought down into the ground and thereafter back to surface, through a conduit arranged in the hole. During this passage, a thermal interchange of heat with the ground is conducted, so that the heat carrier either emits or receives thermal energy or coldness to or from the ground surrounding the hole. Heat pumps can be used in conjunction with the extraction of the heat or the coldness.

Such conventional energy storages can either be used for heating or cooling, or both. The most usual, especially regarding temperature control in small houses, is that the installations are used for heating during the cold period, and that they are inactive during the warm period.

In the case of small houses, the most common usage is one single or only a few holes. However, there are also arrangements using more than just a few holes. In these cases, the conduits of the holes can be either connected in series or in parallel, or in a combination of these, and be located in various geometrical constellations, such as along a straight line or in a grid. However, common to all of these known arrangements is that the heat carrier, flowing through the various conduits, has the same temperature and flow in all holes at the same moment in time. This leads to thermal energy either being replenished into or being harvested from all holes at the same time.

Such energy storages may be installed in, areas where the ground consists of rock, but an installation is also possible on ground consisting of clay, sand, etc. In certain cases, additional, supporting tubes, or other supporting devices, are used during installation.

It is also known to use energy storages in which heat carrier conduits are partly insulated inside the hole or the holes, so that a temperature gradient is achieved along the direction of elongation of a hole. In this way, the coefficient of efficiency of the installation can be increased, since the intensity field of the available thermal energy in the ground can be controlled in the vertical direction.

There are several problems associated with the prior art.

Firstly, the thermal energy or the coldness stored underground around a hole will be dissipated radially, in a direction away from the hole in question. For example, during the cold season, this will render less than all the thermal energy replenished through a hole during the warm season useful, since the replenished thermal energy partly has been led through the ground and away from the hole. This is due to the surrounding ground cooling the heated ground around the hole. The opposite is of course also valid, i.e. if the ground surrounding the hole is cooled during the cold season, this stored coldness will not be fully harvestable during the warm season, because the surrounding ground will have heated the cooled area to a certain extent as it is time to harvest the stored coldness. This problem arises also with such energy storages using several holes, since these known storages either heats or cools the ground surrounding all holes at a certain point in time.

Secondly, a general cooling effect is present for example in residential neighbourhoods. Namely, in such areas, geothermal systems, heating during the winter season and mainly inactive during the summer season, are often located close to one another. This phenomenon occurs despite the additional heat flux from the sun, the atmosphere and the surrounding ground to the cooled rock. The effect is utterly long-term, and successively decreases the coefficient of efficiency of geothermal systems in the areas in question. Therefore, it would be desirable to use devices that interchange heat as well as coldness with the ground with higher efficiency, rather than unidirectionally withdrawing thermal energy.

The present invention solves the above problems.

Thus, the present invention relates to a method for storing thermal energy in, and recapturing thermal energy from, respectively, an underground energy storage, comprising at least four holes, through which a heat carrier is transported and therewith heating or cooling the ground, respectively, and is characterized in that the holes are arranged essentially along at least two concentric circles, in that a control gear is arranged to control a valve system, which is arranged to direct the heat carrier to holes that are arranged along one circle and thereby heating or cooling, respectively, the ground along said circle, in that when the temperature of the heat carrier is higher than that of the surrounding ground, inner circles are heated before outer circles, and in that when the temperature of the heat carrier is lower than that of the surrounding ground, outer circles are cooled before inner circles.

The invention also relates to a device of the type and with essentially the characteristics as described in claim 10.

The invention will now be described in detail, with reference to exemplifying embodiments of the invention and to the appended drawings, in which.

Figure 1:
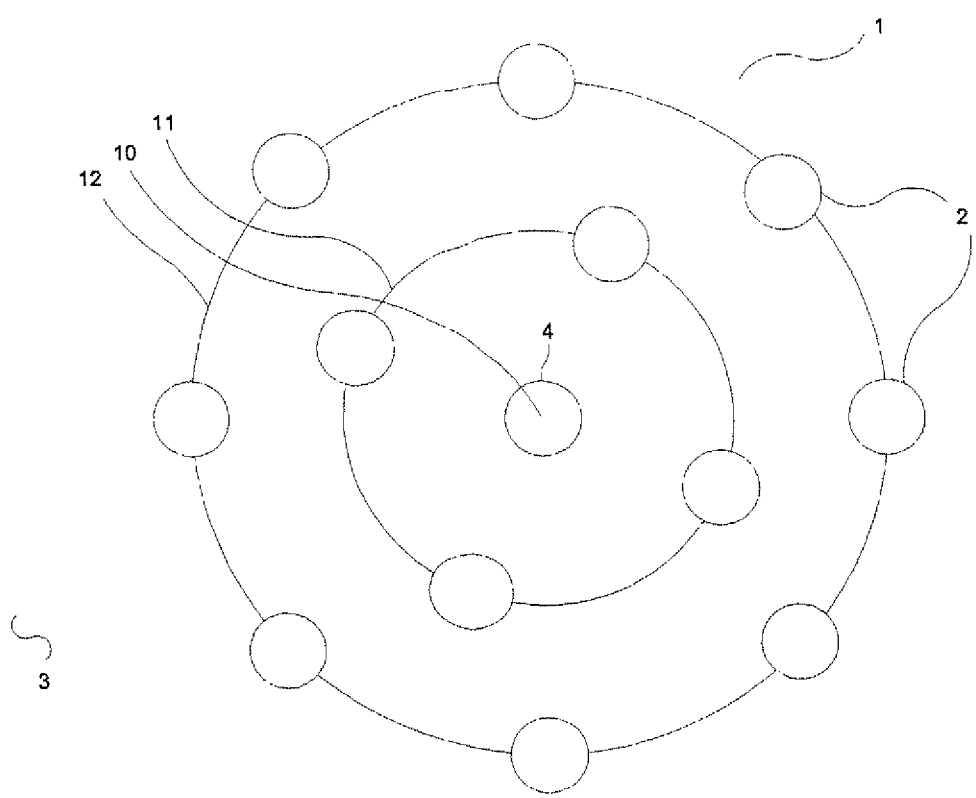
FIG. 1 is a simplified top view of an energy storage according to the present invention.

The energy storage 1, as shown in FIG. 1, consists of thirteen thermal holes 2, arranged at a distance from each other, drilled into the surrounding ground 3. The holes 2 are equidistantly spaced along three respective concentric circles 10, 11, 12, with different radii. As is made clear in FIG. 1, the diameter of the innermost circle is zero, why the thermal hole 4, which is positioned on this innermost circle 10, actually is arranged in the common centre of the concentric circles 10, 11, 12. However, this condition is not necessary; on the contrary, the innermost concentric circle 10 can have a diameter not equal to zero, whereby several holes can be equidistantly spaced along the innermost circle 10.

Furthermore, the number of concentric circles does not have to be three, such as in the energy storage 1 as shown in FIG. 1, but can be any number, however at least 2. Also, it is not necessary to use circles, on the contrary any concentric, closed geometrical set of figures with growing dimensions can be used, such as concentric rectangles with sides of growing size.

The holes 2 are distributed over the various circles 10, 11, 12, such that the distance between every pair of two adjacent holes is about equally large as that between other pairs over essentially the hole energy storage 1. This means that more holes 2 will be arranged along outer circles than along inner circles. In the present embodiment, this means that more holes 2 are arranged along the outer circle 12 than along the middle circle 11. Depending on the thermal conductivity of the surrounding ground 3, a typical such distance between two adjacent holes will be approximately between 3 and 10 meters, usually between 5 and 7 meters.

Every hole 2 in the energy storage 1 has a depth of approximately between 50 and 250 meters, usually of between 150 and 200 meters. The diameter of the outermost circle is approximately between 10 and 250 meters, usually approximately 150 meters.

Figure 2:
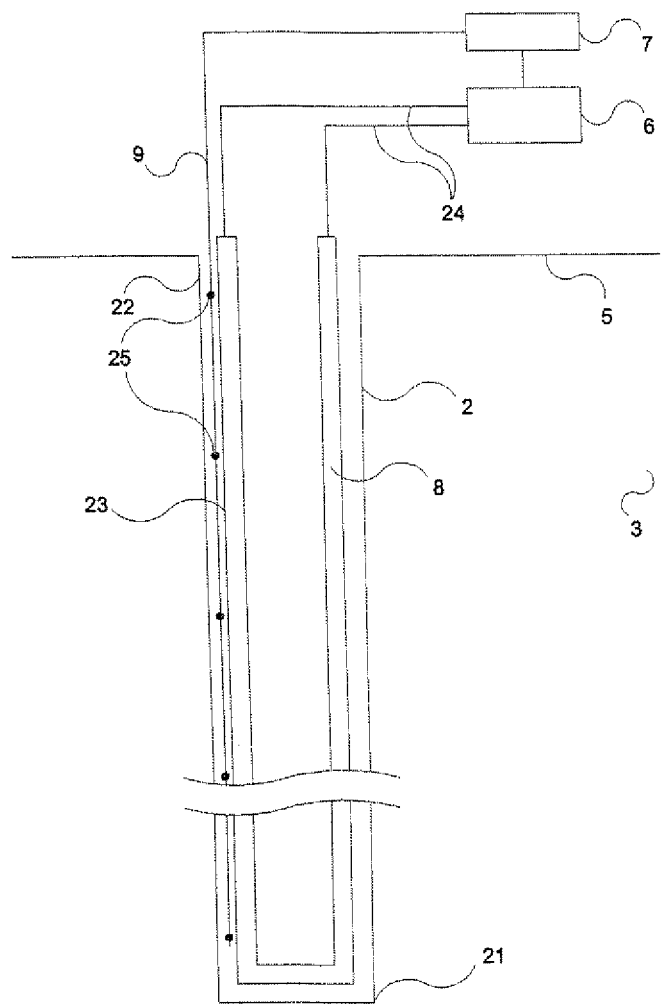
FIG. 2 is a cross-section viewed from the side of a thermal hole according to a first preferred embodiment of the present invention.

FIG. 2 shows one of the thermal holes 2 in the energy storage as shown in FIG. 1, according to a first embodiment of the invention. The hole 2 is drilled down into the ground 3 from ground surface 5. If necessary, depending on the properties of the ground, different support structures, such as a supporting tube, may be arranged in order to increase the stability of the hole (not shown). Means for sealing the hole 2 can also be used (also not shown).

Down into the hole 2, essentially down to the bottom 21 of the hole 2, and further up to the upper end 22 of the hole 2, runs a U-shaped conduit 23. The conduit 23 can be made of any suitable material, such as polyethylene. Thereafter, conduits 24 run up to, and from, the hole 2, from respectively to a valve system 6. A heat carrier 8 flows through the conduits 24, 23, from the valve system 6, down into the hole 2, up through the hole 2, and back to the valve system 6. The heat carrier 8 can be any suitable, fluid medium, such as a mixture of water and glycol, and is preferably frost preventive.

Also, in the hole 2 there is a temperature measuring coil 9, essentially extending over the whole length of the hole 2. The coil 9 can be arranged either inside the conduit 23, outside of the conduit 23 or directly against the wall of the hole 2. In these respective cases, the temperature measuring coil 9 thus measures the temperature of the heat carrier 8, the temperature inside the hole 2 or of that part of the surrounding ground 3 which is located in immediate proximity to the hole 2. In the present embodiment, the coil 9 is arranged on the outside surface of the conduit 23, but it is fully possible to arrange the coil 9 in any of the other mentioned ways, and still not depart from the invention.

The temperature measuring coil 9 measures the temperature using temperature sensors 25, equidistantly arranged along the direction of extension of the hole 2, usually at an interval of approximately 0.5 meters. However, depending on the other properties of the device and on the soil type, the temperature sensors can also be arranged at larger intervals, such as at intervals of 1-5 meters. In FIG. 2, the temperature sensors 25 are not, for reasons of clarity, shown according to scale. The coil 9 is coupled to a control gear 7, such as a computer. Thus, the coil 9 regularly measures the temperature at various depths in the hole 2, and reports measured temperatures to the control gear 7.

The temperature measuring coil 9, comprising the temperature sensors 25, can be of any suitable type, where an example is an optical reading device using conventional optical fibre lines. For example, such a device is commercially available from HydroResearch Sam Johansson AB, Hörnåkersvägen 14, Täby, Sweden. Another example is a series of conventional temperature sensors of the type PT100.

Then, the control gear 7 is coupled to, and arranged to control, the valve system 6. The valve system 6 is in turn arranged to control the individual flow of the heat carrier 8 through the conduit 23, down into the hole 2. Thus, the control gear 7 is arranged to control the flow of the heat carrier 8 through the hole 2 via the valve system 6.

Furthermore, each hole 2 in the energy storage 1 is provided with such a respective temperature measuring coil 9, every temperature measuring coil 9 is coupled to the control gear 7, each hole 2 is arranged with such a respective valve system 6, and the control gear 7 is coupled to each valve system 6, respectively. Thus, the control gear 7 is arranged to control the flow distribution of heat carrier 8 to the respective holes 2 of the energy storage 1, by the continuous and individual control of the flow through each hole 2, respectively.

During operation, the control gear 7 controls the flow of heat carrier 8 through the holes 2, respectively, so that the temperature measured in the holes 2 will be essentially equal for every hole which is arranged along the same concentric circle. In this context, the term "essentially equal" means that the maximum temperature difference between two holes arranged along the same circle does not exceed approximately 1-2° C.

Figure 3:
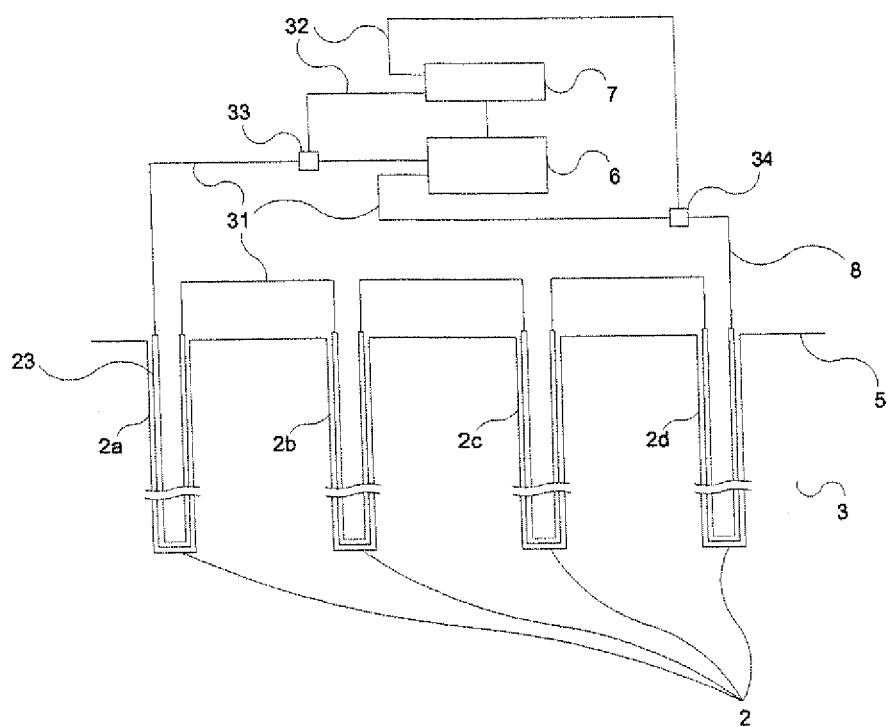
FIG. 3 is a stylized view of a second preferred embodiment of the present invention.

FIG. 3 shows a stylized view of the holes 2 arranged along one of the concentric circles 10, 11, 12 of FIG. 1, according to a second preferred embodiment of the present invention. In FIG. 3, the holes are shown, for reasons of clarity, in a row, despite the fact that they are actually arranged along one of the concentric circles 10, 11, 12 of FIG. 1.

As in FIG. 2, the holes 2 of FIG. 3 are provided with U-shaped conduits 23. These U-shaped conduits 23 are connected in series with conduits 31. Connected in series with holes 2 is also a valve system 6. Hence, a heat carrier 8 flows through the conduits 23, 31, from the valve system 6, down into the first hole 2a, up from the first hole 2a, down into the second hole 2b, and so forth up to the last hole 2d, and again back to the valve system 6.

The temperature of the heat carrier 8 is measured by the use of a first temperature sensor 33, arranged between the outlet from the valve system 6 and the first hole 2a, as well as by the use of a second temperature sensor 34, arranged between the last hole 2d and the inlet of the valve system 6. From these two temperature sensors 33, 34, conduits 32 run to a control gear 7, such as a computer. The temperature sensors 33, 34 can be of any suitable type, for example conventional temperature sensors of the type PT100.

Thereafter, the control gear 7 is coupled to, and arranged to control, the valve system 6. The valve system 6 is in turn arranged to control the flow of the heat carrier 8 through the conduits 23, 31, down into the holes 2. Thus, the control gear 7 is arranged to, via the valve system 6, control the flow of the heat carrier 8 through the holes 2.

Furthermore, the holes 2 along each concentric circle 10, 11, 12 in the energy storage 1 are provided with such respective temperature sensors 33, 34, every temperature sensor 33, 34 is coupled to the control gear 7, each concentric circle 10, 11, 12 is arranged with such a respective valve system 6, and the control gear 7 is coupled to each respective valve system 6. Hence, the control gear 7 is arranged to control the flow distribution of the heat carrier 8 to the holes 2 along each respective concentric circle 10, 11, 12 in the energy storage 1, through the continuous and individual control of the flow through the holes 2 along each respective concentric circle 10, 11, 12.

In both the first and the second preferred embodiments described above, thermal energy can either be replenished to the energy storage 1 or be harvested from the energy storage 1.

In this context, to "replenish energy" means that thermal energy is supplied to the heat storage 1 by the transfer of thermal energy from the heat carrier 8, which flows through the conduit 23 in the holes 2, down into the ground 3. This also means that the heat carrier 8 is cooled during the passage through the holes 2 in the energy storage 1, and that the temperature difference between input- and output temperatures can be used for the cooling of, for example, a house during the relatively warm part of the year. The temperature of the heat carrier flowing down into hole 2 during cooling of a house will typically be 5-18° C., even if variations due to conditions of climate, ground, and other conditions may occur. The cooled heat carrier leaving the hole typically has a temperature which is around 2-6° C. lower than the input temperature, usually 3-4° C. lower.

In this context, to "harvest energy" means that thermal energy is transferred, in an opposite way, from the ground 3 to the heat carrier 8. Thus, the heating of the heat carrier 8 can for example be used, when necessary (such as during the relatively cold part of the year), for heating a house. The temperature of the heat carrier flowing down into hole 2 when heating a house will typically be −3-7° C., even if variations due to conditions of climate, ground and other conditions may occur. The heated heat carrier leaving the hole typically has a temperature which is around 2-6° C. higher than the input temperature, usually 3-4° C. higher.

Noteworthy is that when replenishing the energy storage 1, the temperature of the ground 3 around the heated holes is increased, and when harvesting the temperature of the ground 3 is decreased similarly.

Using the heat storage 1 according to the present invention, substantially better efficiency is achieved at the harvesting of previously replenished thermal energy than which is the case using prior energy storages. This is accomplished by always replenishing thermal energy from the centre of the storage 1 and outwards, and by harvesting of thermal energy from the periphery of the storage 1 and inwards. This decreases the losses due to thermal dissipation at the periphery of the energy storage 1.

Thus, a large part of the thermal energy dissipating from the inner hole or the inner holes, in which the replenishing first started, will be usable at the time of harvest, not/0 withstanding that at that point, part of this energy has dissipated away from the inner hole or the inner holes, because a large part of this dissipated thermal energy is available for harvest at those circles arranged further from the centre than those in which the thermal energy was originally replenished. When the heat exchange is sufficiently low at the outermost circles, the harvesting of circles arranged further inwards is commenced, and so forth, up to a point at which the harvesting process has moved all the way to the innermost circles or to the innermost circle. When the heat exchange from holes arranged along these circles or along this circle has decreased to zero, the energy storage 1 has been emptied, and a substantially larger part of the replenished thermal energy has been available for exploitation as compared to what would have been the case with a conventional energy storage.

Thus, thermal energy is replenished and harvested, respectively, from the middle outward and from the periphery inwards, in the heat storage 1, by the utilization of the concentric circles 10, 11, 12, one after the other in order of ascending or descending radius, respectively, for replenishing and harvesting of heat. Depending on where the temperature is measured, various conditions for commencing the replenishment and the harvest, respectively, of thermal energy, along the next circle in order, can be applied. In case the temperature is measured in each respective hole 2 along each respective concentric circle 10, 11, 12, a preferred such condition is that the temperature in the holes along the circle which at the moment is replenishing or harvesting, respectively, thermal energy, should be essentially as high as in the holes along the prior circle in order. When the temperature is measured in a conduit 31, connecting all holes 2 along a concentric circle, one preferred such condition is that the temperature in the conduit connecting the holes along the circle which at the moment is replenishing or harvesting, respectively, thermal energy should be essentially as high as in the conduit connecting the holes along the prior circle in order. However, it is realized that other conditions are both possible and usable, depending upon, among other things, the arrangement of the temperature sensors 25, 33, 34, and upon the way the valve system 6 controls the flow of the heat carrier 8 through the holes 2 in the heat storage 1.

In this context, by "essentially as high as" is meant that the maximum temperature difference between two holes along neighbouring circles does not exceed around 1-5° C.

Furthermore, when the energy storage is out of thermal energy, the outermost wells can be used as conventional geothermal holes, in order for thus rendering it possible to harvest more energy than what was previously stored in the energy storage 1.

Above, exemplifying embodiments have been disclosed. However, the invention may be varied without departing from the invention. Therefore, the present invention shall not be regarded as limited by these exemplifying embodiments, but only by the scope of the appended claims.

The invention claimed is:

1. A method for storing thermal energy in, and recapturing thermal energy from, respectively, an underground energy storage (1), comprising at least four drilled holes (2) in the ground (3) and arranged at a distance from each other, said holes (2) having depths of at least 50 meters into the ground, said holes (2) arranged essentially along plural concentric circles (10, 11, 12), the plural concentric circles defining inner circles and outer circles, a control gear (7) arranged to control a valve system (6) arranged to direct a heat carrier (8), via a conduit (23) located in the holes, serially connecting the holes of each respective circle, and in the plural concentric circles, to different, respective ones of said holes arranged along each one of the circles to respectively thereby heat and cool surrounding ground along the circles so that the heat carrier can be circulated along different ones of the circles individually allowing a first of the circles to operate as a cooling source while a second of the circles operates as a heating source, the heat carrier being within a closed system and the ground surrounding the circles and holes being the underground energy storage, a temperature measuring coil (9) extending over a depth of at least one hole (2) of each circle, the temperature measuring coil (9) measuring one of the group consisting of i) the temperature of the heat carrier (8) within the hole, ii) the temperature inside the hole, and iii)

a part of surrounding ground located in immediate proximity to the hole, the temperature measuring coil (9) comprising plural spaced-apart temperature sensors arranged along a depth direction of an extension of the hole such that one temperature sensor is located proximate a lower part of the hole and another temperature sensor is located proximate an upper part of the hole, the temperature measuring coil being coupled to the control gear (7) said method comprising:

each temperature measuring coil regularly measuring the temperature at various depths in the corresponding hole, and reporting measured temperatures to the control gear, using the control gear (7) to control the valve system to transport the heat carrier (8) via the conduit through the serially connected holes respectively defining each the concentric circles heating and cooling the ground (3), respectively, when the temperature of the heat carrier (8) is higher than the temperature of the surrounding ground (3), heating the ground surrounding the inner circles before heating the ground surrounding the outer circles, the ground surrounding the circles being heated in order of ascending radius by the control gear (7) controlling the valve system (6) to control the flow distribution of heat carrier (8) through the conduit (23) to the holes along every respective concentric circle so that the ground surrounding the circles are heated from the innermost circle outward to the outermost circle, and when the temperature of the heat carrier (8) is lower than the temperature of the surrounding ground (3), using the control gear (7) to control the valve system to transport the heat carrier (8) to cool the ground surrounding the outer circles before cooling the ground surrounding the inner circles, the ground surrounding after cooling the outer circles, the ground surrounding cooling the inner circles, in the heating and the cooling by the heat carrier flowing through the conduit, respectively, all wells along a current circle are heated or cooled simultaneously, wherein the ground (3) surrounding the circles and the holes serves as the underground energy storage (1) with the ground being heating from and cooled by the heat carrier.

2. The method according to claim 1, wherein,
the heating and the cooling by the heat carrier flowing through the conduit, respectively, of the next circle is commenced when the temperature difference between the heat carrier in the currently heated or cooled circle, respectively, and a neighbouring circle is below a predetermined value.

3. The method according to claim 1, wherein,
the control gear (7) controls the valve system (6) and thereby the heat carrier flow in the conduit, which in turn controls the applied heating or cooling effect of every hole (2) individually, so that the difference between the lowest and the highest temperature, respectively, between every pair of holes (2) arranged essentially along the same concentric circle (10, 11, 12) is brought below a predetermined value across the whole circle (10, 11, 12).

4. The method according to claim 1, wherein the conduit in each hole is a U-shaped conduit, so that the heat carrier (8) is led in the U-shaped conduit (23), down into, and up from, each hole (2).

5. Method according to claim 1, wherein coldness is harvested from the heat storage (1) at the circle, or circles, where the lowest current thermal energy content is found in the heat storage (1).

6. The method according to claim 1, wherein the distance between holes (2) is arranged to be between 2 and 10 meters.

7. The method according to claim 1, wherein the maximum distance between two holes (2) is arranged to be between 10 and 250 meters.

8. The method according to claim 1, wherein the depths of the holes (2) are arranged to be at the most 200 meters.

9. The method according to claim 1, wherein the diameters of the holes (2) are arranged to be between 10 and 50 centimetres.

10. A device for storing thermal energy in, and recapturing thermal energy from, respectively, an underground energy storage (1), comprising:

at least four holes (2), said holes (2) being drilled holes (2) extending to a depth in the ground of at least 50 meters and arranged at a distance from each other, said holes (2) being arranged to transport therethrough a heat carrier (8) and thus heating or cooling the ground (3), respectively, the holes (2) arranged essentially along plural independent concentric circles (10, 11, 12), the circles defining inner circles and outer circles, each inner and outer circle providing one of a cooling source and a heating source independent of remaining ones of the circles, a control gear (7) arranged to control a valve system (6) controlling heat carrier flow through a conduit (23) located in said holes, serially connecting the holes of each respective circle, and in said circles, the valve system arranged to selectively direct the heat carrier (8) via the conduit (23) to the holes that are arranged along one circle, and thereby selectively heating and cooling, respectively, the ground along said a selected circle allowing a first of the circles to operate as a cooling source while a second of the circles operates as a heating source, a temperature measuring coil (9) associated with each each circle, the temperature measuring coil (9) measuring one of the group consisting of i) the temperature of the heat carrier (8) within the hole, ii) the temperature inside the hole, and iii) a part of surrounding ground located in immediate proximity to the hole, the temperature measuring coil being coupled to the control gear (7), wherein, the heat carrier (8) is arranged to be transported in a closed system with each temperature measuring coil regularly measuring the temperature at various depths in the corresponding hole, and reporting measured temperatures to the control gear, the control gear (7) is arranged to circulate the heat carrier along different ones of the circles individually and i) to control the valve system (6) so that the ground surrounding the inner circles are heated before the ground surrounding the outer circles are heated when the temperature of the heat carrier (8) is higher than that of the surrounding ground (3) by heating the ground surrounding the circles in order of ascending radius by the control gear (7) controlling valve system to control the flow distribution of heat carrier (8) through the conduit to the holes along every respective concentric circle so that the ground surrounding the circles are heated from the innermost circle outward to the outermost circle, and ii) to control the valve system (6) so that the ground surrounding the outer circles are cooled before the ground surrounding the inner circles, and after cooling the ground surrounding the outer circles the ground surrounding the inner circles are cooled, when the temperature of the heat carrier (8) is lower than that of the surrounding ground (3), in the heating and the cooling by the heat carrier flowing through the conduit, respectively, all wells along a current circle are heated or cooled simultaneously, wherein the ground (3) surrounding the circles and the holes is the underground energy storage (1), and the ground is heating and cooled from the heat carrier.

11. The device according to claim 10, wherein, the control gear (7) is arranged to control the valve system (6), and the valve system in turn is arranged to control, by controlling the flow of the heat carrier through the conduit, the temperature difference between every neighbouring circle, so that the heating and the cooling, respectively, of the next circle is commenced when the temperature difference between the heat carrier in the currently heated or cooled circle, respectively, and a neighbouring circle is below a predetermined value.

12. The device according to claim 10, wherein, the control gear (7) is arranged to control the valve system (6), and the valve system in turn is arranged to control the supplied heating or cooling effect of every hole (2) individually, so that the difference between the lowest and the highest temperature, respectively, in all holes (2) arranged essentially along the same concentric circle (10, 11, 12) is below a predetermined value across the whole circle (10, 11, 12).

13. The device according to claim 10, wherein the conduit in each hole is a U-shaped conduit (23) arranged to lead the heat carrier (8) down into, and up from, each hole (2).

14. The device according to claim 10, wherein the control gear (7) is arranged to control the valve system, in order to harvest coldness from the heat storage (1) at the circle, or circles, where the lowest current thermal energy content is found in the heat storage (1).

15. The device according to claim 10, wherein the distance between holes (2) is between 2 and 10 meters.

16. The method of claim 1, wherein the control gear is controlled so that only a single circle is cooled and heated at any time, wherein a first plurality of serially connected holes define a first circle and the when the temperature of the heat carrier is higher than the temperature of the ground surrounding the first circle, the control gear controls the valve system to control the flow distribution of heat carrier through the conduit and at the same time through each of the first plurality of serially connected holes so that the ground surrounding the first circle is heated from heat carrier, and wherein a second plurality of serially connected holes define a second circle and the when the temperature of the heat carrier is higher than the temperature of the ground surrounding the first circle, the control gear controls the valve system to control the flow distribution of heat carrier through the conduit and at the same time through each of the second plurality of serially connected holes so that the ground surrounding the first circle is heated from heat carrier.

17. The device of claim 10, wherein the control gear is configured so that only a single circle is cooled and heated at any time, wherein a first plurality of serially connected holes define a first circle and the when the temperature of the heat carrier is higher than the temperature of the ground surrounding the first circle, the control gear controls the valve system to control the flow distribution of heat carrier through the conduit and at the same time through each of the first plurality of serially connected holes so that the ground surrounding the first circle is heated from heat carrier, and wherein a second plurality of serially connected holes define a second circle and the when the temperature of the heat carrier is higher than the temperature of the ground surrounding the first circle, the control gear controls the valve system to control the flow distribution of heat carrier through the conduit and at the same time through each of the second plurality of serially connected holes so that the ground surrounding the first circle is heated from heat carrier.

18. A method for storing thermal energy in, and recapturing thermal energy from, respectively, an underground energy storage (1), comprising at least four drilled holes (2) in the ground (3) and arranged at a distance from each other, said holes (2) having depths of at least 50 meters into the ground, said holes (2) arranged essentially along plural concentric circles (10, 11, 12), the plural concentric circles defining inner circles and outer circles, a control gear (7) arranged to control a valve system (6) arranged to direct a heat carrier (8), via a conduit (23) located in the holes, serially connecting the holes of each respective circle, and in the plural concentric circles, to different, respective ones of said holes arranged along each one of the circles to respectively thereby heat and cool surrounding ground along the circles so that the heat carrier can be circulated along different ones of the circles individually allowing a first of the circles to operate as a cooling source while a second of the circles operates as a heating source, the heat carrier being within a closed system and the ground surrounding the circles and holes being the underground energy storage, a temperature measuring sensor measuring one of the group consisting of i) the temperature of the heat carrier (8), ii) the temperature within one of the holes, and iii) a part of surrounding ground located in immediate proximity to one of the holes, the temperature measuring coil being coupled to the control gear (7) said method comprising:

each temperature measuring coil regularly measuring the temperature at various depths in the corresponding hole, and reporting measured temperatures to the control gear, using the control gear (7) to control the valve system to transport the heat carrier (8) via the conduit through the serially connected holes respectively defining each the concentric circles heating and cooling the ground (3), respectively, when the temperature of the heat carrier (8) is higher than the temperature of the surrounding ground (3), heating the ground surrounding the inner circles before heating the ground surrounding the outer circles, the ground surrounding the circles being heated in order of ascending radius by the control gear (7) controlling the valve system (6) to control the flow distribution of heat carrier (8) through the conduit (23) to the holes along every respective concentric circle so that the ground surrounding the circles are heated from the innermost circle outward to the outermost circle, and when the temperature of the heat carrier (8) is lower than the temperature of the surrounding ground (3), using the control gear (7) to control the valve system to transport the heat carrier (8) to cool the ground surrounding the outer circles before cooling the ground surrounding the inner circles, the ground surrounding after cooling the outer circles, the ground surrounding cooling the inner circles, in the heating and the cooling by the heat carrier flowing through the conduit, respectively, all wells along a current circle are heated or cooled simultaneously, wherein the ground (3) surrounding the circles and the holes serves as the underground energy storage (1) with the ground being heating from and cooled by the heat carrier.

19. The method according to claim 1, wherein, the temperature measuring coil (9) measures the part of surrounding ground located in immediate proximity to the holes of each circle, and the heating and the cooling by the heat carrier flowing through the conduit, respectively, of the next circle is commenced when the temperature difference between i) the measured part of the surrounding ground located in immediate proximity to the holes of the currently circle and ii) the measured part of the surrounding ground located in immediate proximity to the holes of a previous circle is within a range of 1-5° C., the previous circle being a circle heated or cooled immediately before the current circle.

20. The method according to claim 1, wherein, the temperature measuring coil (9) measures the part of surrounding ground located in immediate proximity to the holes of each circle, and the heating and the cooling by the heat carrier flowing through the conduit, respectively, of the next circle is commenced when the temperature difference between i) the measured part of the surrounding ground located in immediate proximity to the holes of the currently circle and ii) the measured part of the surrounding ground located in immediate proximity to the holes of a previous circle is below a predetermined value, the previous circle being a circle heated or cooled immediately before the current circle.

* * * * *